(12) United States Patent
Kurita

(10) Patent No.: US 6,379,829 B1
(45) Date of Patent: Apr. 30, 2002

(54) FUEL CELL SYSTEM

(75) Inventor: Kenji Kurita, Nagoya (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/466,795

(22) Filed: Dec. 20, 1999

(30) Foreign Application Priority Data

Dec. 18, 1998 (JP) .............................................. 10-360995

(51) Int. Cl.⁷ ............................. H01M 8/04; H01M 2/00
(52) U.S. Cl. ............................... 429/17; 429/19; 429/34
(58) Field of Search ............................ 429/17, 19, 34

(56) References Cited

U.S. PATENT DOCUMENTS

| | | | | |
|---|---|---|---|---|
| 4,743,517 A | * | 5/1988 | Cohen et al. ................. | 429/17 |
| 4,820,594 A | * | 4/1989 | Sugita et al. .................. | 429/17 |
| 5,360,679 A | * | 11/1994 | Buswell et al. ................ | 429/19 |
| 6,106,963 A | * | 8/2000 | Nitta et al. .................... | 429/19 |

FOREIGN PATENT DOCUMENTS

JP          6-325780           11/1994

* cited by examiner

*Primary Examiner*—Carol Chaney
*Assistant Examiner*—Tracy Dove
(74) *Attorney, Agent, or Firm*—Oblon, Spivak, McClelland, Maier & Neustadt, P.C.

(57) ABSTRACT

A fuel cell system includes a fuel-cell stack 4 for generating electricity by using a fuel gas and an oxidizing gas, a combustion device 3 for burning an off-gas of the fuel gas, and a water recovering device 8 for recovering a vapor of an exhaust gas resulting from the burning.

7 Claims, 1 Drawing Sheet

FUEL CELL SYSTEM

BACKGROUND OF THE INVENTION

1. Field of the Invention

The present invention is directed to a fuel cell system.

2. Description of the Related Art

A conventional fuel cell system is disclosed in, for example, Japanese Patent Laid-open Print No. Hei.6-325780 published without examination on Nov. 25, 1994. In this fuel cell system, water in an off-gas of a fuel gas and an off-gas of an oxidizing agent gas are recycled. To this end, water vapor or the water in gas phase within the off-gas of the fuel gas is condensed at a gas separator provided in a conduit through which the off-gas of the fuel gas passes, while water vapor or the water in gas phase of the off-gas of the oxidizing agent gas is condensed at a gas separator provided in a conduit through which the off-gas of the oxidizing agent passes.

However, in the foregoing conventional fuel cell system, if efficient water recovery is desired, a pressure loss in each conduit becomes large, thereby possibly lowering the efficiency of the entire fuel cell system.

SUMMARY OF THE INVENTION

It is, therefore, a principal object of the present invention to provide a fuel cell system which is free from the foregoing drawback.

In order to attain the above and other objects, the present invention provides a fuel cell system which comprises a fuel-cell stack for generating electricity by using a fuel gas and an oxidizing gas; a combustion device for burning an off-gas of the fuel gas from the fuel-cell stack; and water recovering means for recovering a vapor of an exhaust gas resulting from combustion.

BRIEF DESCRIPTION OF THE DRAWINGS

The above and other features and advantages of the present invention will be more readily apprehended from the following detailed description when read in connection with the appended drawing, which forms a part of this original disclosure, and wherein the sole drawing is a schematic diagram of a solid-state polyelectrolyte type fuel cell system according to an embodiment of the present invention.

DETAILED DESCRIPTION OF THE PREFERRED EMBODIMENT

Figure 1:
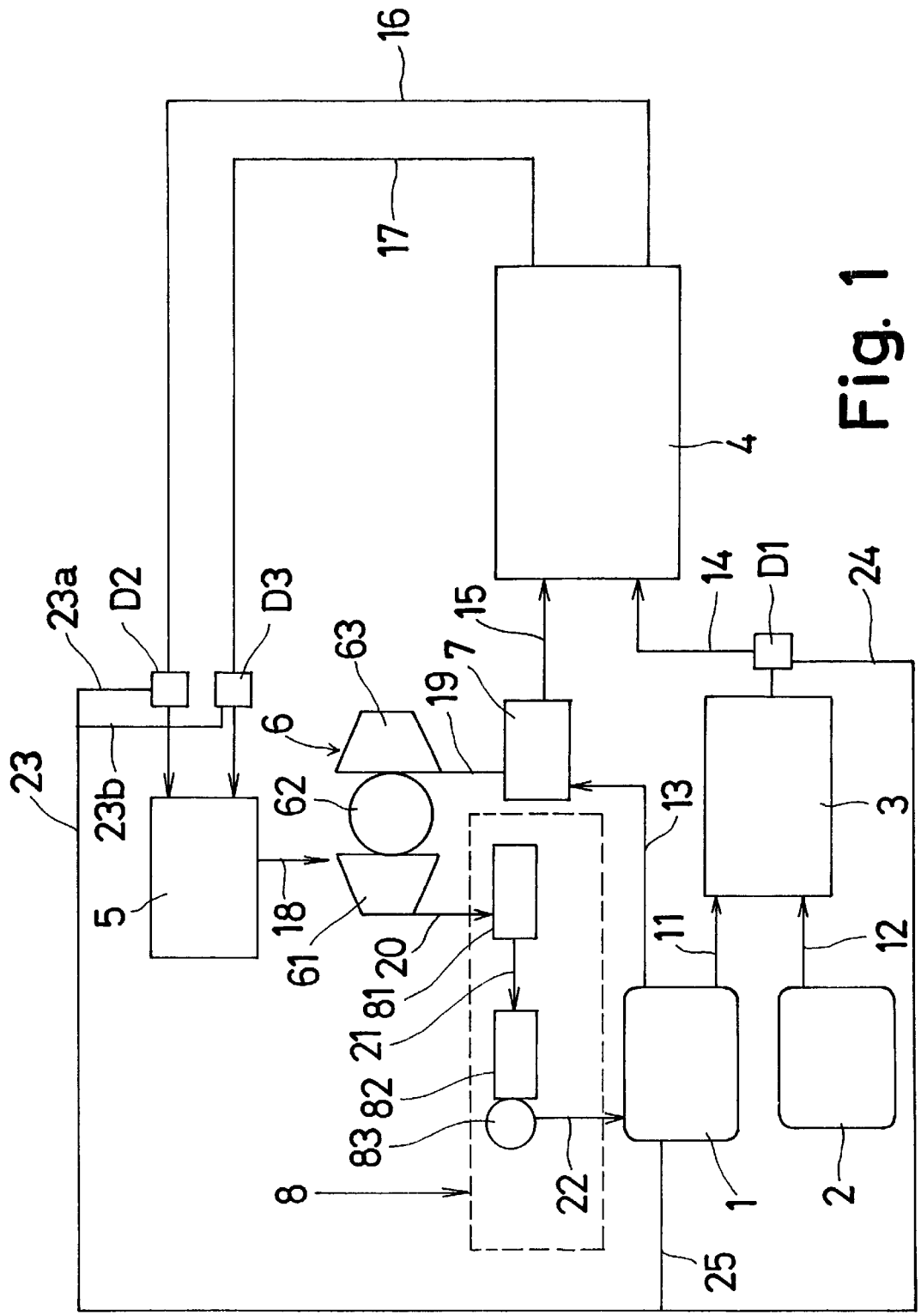

With reference to the drawing, there is illustrated a schematic diagram of a solid-state polyelectrolyte type fuel cell system according to an embodiment of the present invention.

The fuel system includes, as its main elements, a water tank 1, a methanol tank 2 for storing therein an amount of methanol which is a kind of hydrocarbon family fuel, a reforming device 3, a fuel-cell stack 4, a burner 5, a turbo-assisted compressor 6, a humidifier 7 and a water collector 8. The burner 5 burns or combusts off-gas of hydrogen gas from the fuel-cell stack 4 by using off-gas of oxygen as combustion agent.

The tank 1 stores water to be used as a raw material of the fuel gas and medium for humidification. The tank 1 is connected to the reforming device 3 by way of a conduit 11 and is also connected to the humidifier 7 by way of a conduit 13. It is to be noted that separate tanks can be provided for storing therein water for the fuel gas and water for the humidity, respectively.

The methanol tank 2 stores methanol as a raw material of the fuel gas and is connected to the reforming device 3 by way of a methanol conduit 12. The reforming device 3 reforms the water and methanol, each of which is treated as a fuel for forming the fuel gas whose principal component is hydrogen. The reforming device 3 is connected to the fuel cell stack 4 by way of the fuel gas conduit 14 having a drain device D1 which collects condensed water.

The turbo-assist compressor 6 includes a turbine 61, an electric motor 62 and a compressor 63. The compressor 63 pressurizes air supplied thereto and the resultant compressed air is fed as an oxidizing agent to an oxidizing plate of the fuel cell stack 4. The compressor 63 is connected to the humidifier 7 by way of an air conduit 19. The humidifier 7 is in turn connected to the fuel cell stack 4 by way of an air passage 15.

The off-gas of the fuel gas which has not been used in the fuel cell stack 4 is fed to the burner 5 by way of a fuel off-gas conduit 16, while the off-gas of the air is fed to the burner 5 by way of an air off-gas conduit 17. The fuel off-gas conduit 16 is provided therein with a drain device D2 for collecting condensed water. Similarly, air off-gas conduit 17 is provided therein with a drain device D3 for collecting condensed water.

The hot combustion products from the burner 5 are led to the turbine 61 of the turbo-assist compressor 6 by way of an exhaust gas conduit 18.

The water collector 8 is made up of a condenser 81, a drain device 82, and a pump 83. The condenser 81 and the drain device 82 are connected by way of a collecting conduit 21. The pump 83 is attached or annexed to the drain device 82 and pumps excess water from the drain device 82 to the water tank 1 by way of a water collecting conduit 22.

The turbine 61 is connected to the condenser 81 by way of an exhaust gas conduit 20. Water vapor in the turbine exhaust is thus condensed.

In addition, the drain device D1 is connected to the water tank 1 by way of condensed water conduits 24 and 25. The drain device D2 is connected to the water tank 1 by way of condensed water conduits 23$a$, 23 and 25. The drain device D3 is connected to the water tank 1 by way of condensed water conduits 23$b$, 23 and 25.

The reforming device 3 reforms the water and methanol supplied thereto from the water tank 1 via the conduit 11 and from the methanol tank 2 via the conduit 12 to form the fuel gas whose principal component is hydrogen. For reforming the water and the methanol into the fuel gas, there are two well known methods: the reforming evaporating method and the partial reforming method.

The reforming evaporating method produces a fuel gas whose main component is hydrogen by contacting evaporated methanol and water at a copper-zinc family catalyst, to produce the chemical reaction: $CH_3OH + H_2O \rightarrow 3H_2 + CO_2$.

The partial reforming method produces a fuel gas whose main component is hydrogen by contacting a mixture of air, evaporated methanol and evaporated water at an oxidizing catalyst and a copper-zinc family catalyst, which results in the following chemical reaction:

$CH_3OH + 0.13 O_2 + 0.47 N_2 + 0.75 H_2O \rightarrow 2.75 H_2 + CO_2 + 0.47 N_2$.

In each chemical reaction, due to the fact that water moves together with movements of $H^+$ from the fuel electrode, for adding water in gas phase or water vapor to the fuel gas, a much more than sufficient amount of water for each chemical reaction is supplied to the reforming device 3. In the case where the electrolyte is a solid-state polyelectrolyte type, for maintaining its performance, the fuel gas has to contain therein a much more than sufficient amount of water.

The fuel gas produced at the reforming device 3 is fed to a fuel electrode side of the fuel cell stack 4 by way of the conduit 14. In the event that some of the fuel gas is condensed in the conduit 14, the resultant or condensed water is collected at the drain device D1 and is returned to the water tank 1 by way of conduits 24 and 25.

On the other hand, when the motor 62 of the turbo-assist compressor 6 is turned on, thereby driving the compressor 63, the resultant air under compression is supplied to the humidifier 7 by way of the conduit 19. At the humidifier 7, the air contacts and absorbs water vapor from the water which is fed from the water tank 1 to the humidifier 7 by way of the conduit 13. The resultant humidified air is supplied by way of the conduit 15 to the oxidizing electrode side of the fuel cell stack 4.

The fuel gas and the air supplied to the fuel electrode and the oxidizing electrode of the fuel cell stack 4, respectively, produce or generate electricity. At this time, an off-gas of air is fed to the conduit 17. The off-gas of air includes both the water in the air supplied from the humidifier 7 and the water moved to the oxidizing electrode from the fuel electrode in the fuel cell stack 4 together with H+.

In the fuel cell stack 4, 100% consumption of hydrogen is not attained, and about 80% consumption thereof is the most efficient case. The off-gas of the fuel gas which has not been consumed during the chemical reaction is fed to the burner 5 by way of the conduit 16. The remainder of the water moved to the oxidizing electrode is contained, as vapor, in the off-gas of the fuel gas. The air exhausted into the conduit 17 is also fed to the burner 5.

In the event that some of the vapor in the off-gas of the fuel gas is condensed in the conduit 16, the resultant or condensed water is collected at the drain device D2 and is returned to the water tank 1 by way of conduits 23a, 23, and 25. Similarly, in the event that some of the off-gas of the air is condensed in the conduit 17, the resultant or condensed water is collected at the drain device D3 and is returned to the water tank 1 by way of conduits 23b, 23 and 25.

In the burner 5, the hydrogen in the off-gas of the fuel gas is burned using the oxygen in the off gas of the air as a combustion agent, thereby generating or producing water as a by-product. The resultant exhaust gas issued from the burner 5 is fed to the turbine 61 of the turbo-assisted compressor 6 and the resultant rotation of the turbine 61 is used as a driving source for driving the compressor 63. Immediately upon initiation of the turbine 61, the electric power supplied to the motor 62 is stopped or reduced, thereby enabling saving the electric energy consumed at the turbo-assisted compressor 6.

The turbine exhaust gas includes the humidifying water, the produced water, and the water which results from oxidizing the hydrogen in the off-gas of the fuel gas. The exhaust gas is fed to the condenser 81 of the water collector 8 by way of the conduit 20. Thus, the vapor in the exhaust gas is condensed to water, which is fed to the drain device 82 by way of the conduit 21, and then to the water tank 1 via the pump 83.

In the foregoing fuel cell system, the hydrogen energy in the off-gas of the fuel gas can be used for dynamic power in addition to the almost perfect collection of the water in each of the off-gas of the fuel gas and the off-gas of the air. Moreover, the pressures of the off-gas of the fuel gas and the off-gas of the air are released at the burner 5, thereby minimizing pressure losses in the respective conduits.

The invention has thus been shown and description with reference to specific embodiments, however, it should be understood that the invention is in no way limited to the details of the illustrates structures but changes and modifications may be made without departing from the scope of the appended claims.

What is claimed is:

1. A fuel cell system comprising:

a water storage device;

a fuel gas reformer connected and positioned to receive water from the water storage device;

a fuel-cell stack for generating electricity by using a fuel gas from the fuel gas reformer and an oxidizing gas;

a combustion device connected to receive and burn an off-gas of the fuel gas from the fuel-cell stack; and water recovering means for recovering water directly from an exhaust gas from the combustion device and delivering the recovered water directly to the water storage device.

2. A fuel cell system as set forth in claim 1, wherein the combustion device receives an off-gas of the oxidizing gas from the fuel-cell stack as a combustion agent.

3. A fuel cell system as set forth in claim 1, wherein the water recovering means includes a condenser receiving the exhaust gas from the combustion device, a water collector connected to collect water condensed in the condenser, and conveyer connected to convey the collected water to the water storage device.

4. A fuel cell system as set forth in claim 1, further comprising:

a turbine driven by the exhaust gas from the combustion device; and an oxygen gas supply device driven by the turbine and connected for supplying an oxygen bearing gas to the fuel cell stack.

5. A fuel cell system as set forth in claim 4, wherein the oxygen gas supply device is also driven by a motor.

6. A fuel cell system as set forth in claim 3, further comprising:

a turbine driven by the exhaust gas from the combustion device; and an oxygen gas supply device driven by the turbine and connected for supplying an oxygen bearing gas to the fuel cell stack.

7. A fuel cell system as set forth in claim 6, wherein the oxygen gas supply device is also driven by a motor.

* * * * *